(12) United States Patent
He et al.

(10) Patent No.: US 11,288,535 B1
(45) Date of Patent: Mar. 29, 2022

(54) METHOD AND SYSTEM FOR IDENTIFYING FIELD BOUNDARY

(71) Applicant: Zhejiang University, Hangzhou (CN)

(72) Inventors: Yong He, Hangzhou (CN); Hui Fang, Hangzhou (CN); Xiya Zhang, Hangzhou (CN); Zeqing Zhang, Hangzhou (CN)

(73) Assignee: Zhejiang University

( * ) Notice: Subject to any disclaimer, the term of this patent is extended or adjusted under 35 U.S.C. 154(b) by 0 days.

(21) Appl. No.: 17/467,813

(22) Filed: Sep. 7, 2021

(30) Foreign Application Priority Data

May 12, 2021 (CN) .......................... 202110517222.0

(51) Int. Cl.
| | |
|---|---|
| *G06K 9/00* | (2006.01) |
| *G06K 9/46* | (2006.01) |
| *G06K 9/62* | (2022.01) |
| *G06T 7/11* | (2017.01) |
| *G06T 7/13* | (2017.01) |
| *G06K 9/32* | (2006.01) |
| *G06T 3/60* | (2006.01) |
| *G06N 3/08* | (2006.01) |
| *G06T 7/136* | (2017.01) |

(52) U.S. Cl.
CPC ......... *G06K 9/4604* (2013.01); *G06K 9/3233* (2013.01); *G06K 9/6217* (2013.01); *G06N 3/08* (2013.01); *G06T 3/60* (2013.01); *G06T 7/11* (2017.01); *G06T 7/13* (2017.01); *G06T 7/136* (2017.01); *G06T 2207/20081* (2013.01); *G06T 2207/20084* (2013.01)

(58) Field of Classification Search
CPC .. G06K 9/4604; G06K 9/3233; G06K 9/6217; G06N 3/08; G06T 3/60; G06T 7/11; G06T 7/13; G06T 7/136; G06T 2207/20081; G06T 2207/20084
See application file for complete search history.

(56) References Cited

U.S. PATENT DOCUMENTS

| | | | | |
|---|---|---|---|---|
| 2019/0139225 | A1* | 5/2019 | Wang | G06K 9/4604 |
| 2021/0134007 | A1* | 5/2021 | Ahmed | G06K 9/6215 |
| 2021/0150805 | A1* | 5/2021 | Stekovic | G06T 19/006 |
| 2021/0248392 | A1* | 8/2021 | Zaheer | G06K 9/4628 |

* cited by examiner

*Primary Examiner* — Ping Y Hsieh
(74) *Attorney, Agent, or Firm* — Fei Hung Yang

(57) ABSTRACT

A method and a system for identifying a field boundary are provided. The method includes pre-processing acquired original images to obtain an image data set; training an improved U-Net network to obtain a segmentation model of field regions by taking images in the image data set as inputs, and marked images corresponding to the input images as outputs; wherein the marked images are binary images for distinguishing the field regions from non-field regions, an inverted residual block is set between maximum pooling layers of an encoder of the improved U-Net network, and an inverted residual block is set between deconvolutional layers of a decoder of the improved U-Net network; inputting a current frame image into the segmentation model, outputting a current binary image, and determining a field-side boundary line and a field-end boundary line based on a frame association algorithm and an RANSAC line fitting method.

9 Claims, 11 Drawing Sheets

METHOD AND SYSTEM FOR IDENTIFYING FIELD BOUNDARY

CROSS REFERENCE TO RELATED APPLICATION

This patent application claims the benefit and priority of Chinese Patent Application No. 202110517222.0 filed on May 12, 2021, the disclosure of which is incorporated by reference herein in its entirety as part of the present application.

TECHNICAL FIELD

The present invention relates to the field of boundary identification, and in particular to a method and system for identifying a field boundary.

BACKGROUND ART

An automatic navigation technology of an agricultural machinery, as a core of agricultural machinery intelligence and automation, is a premise of realizing precision agriculture. At present, there are GPS navigation, machine vision navigation, multi-sensor fusion navigation and so on. The navigation technology based on machine vision is widely concerned by researchers at home and abroad because of its ability to adapt to the complicated field operation environment, wide detection range and rich and complete information.

The automatic navigation technology of the agricultural machinery mainly includes three parts: an automatic walking during a normal operation in a field, an automatic obstacle avoidance when encountering obstacles in the field and an automatic steering in a field boundary. For the first two parts, there have been a large number of domestic and international researches, which can meet the effectiveness and accuracy of the operation, and the technology is relatively mature. But at present, the process of turning around when the agricultural machinery reaches the field boundary still requires a manual operation. Therefore, it is urgent to study the autonomous steering technology at the field boundary to realize the automatic navigation of the agricultural machinery.

In an unstructured field operation environment, in order to realize the automatic steering of the agricultural machinery at the field boundary, spatial position information of the field boundary needs to be identified firstly. At present, there are many researches on turning path planning and steering control for the agricultural machinery at a field end, but there are few researches on a detection of the spatial position information of the field boundary.

At present, in a traditional method for detecting the field boundary, the complicated field environment has a great influence on an extraction of the field boundary. In a detection process, in addition to the field boundary, there are serious environmental noises such as wheel marks weeds, and areas with uneven illumination or large simple color change in the field. These environmental noises interfere with an extraction of a true boundary during boundary extraction process.

SUMMARY

The present disclosure intends to provide a method and a system for identifying a field boundary, which improve an accuracy of the identification for the boundary.

In order to achieve the above effects, the present disclosure provides the following solution:

A method for identifying a field boundary, which includes:

pre-processing acquired original images to obtain an image data set;

training an improved U-Net network to obtain a segmentation model of field regions by taking images in the image data set as inputs and marked images corresponding to the input images as outputs; wherein the marked images are binary images for distinguishing the field regions from non-field regions; an inverted residual block is set between maximum pooling layers of an encoder of the improved U-Net network, and the inverted residual block is set between the deconvolutional layers of a decoder of the improved U-Net network;

inputting a current frame image into the segmentation model of the field regions, outputting a current binary image, and determining a field-side boundary line and a field-end boundary line of the current binary image based on a frame association algorithm and a Random Sample Consensus (RANSAC) line fitting method.

In an embodiment, the step of inputting the current frame image into the segmentation model of the field regions, outputting the current binary image, and determining the field-side boundary line and the field-end boundary line of the current binary image based on the frame association algorithm and the RANSAC line fitting method specifically includes:

inputting the current frame image into the segmentation model of the field regions to output the current binary image;

obtaining a region with the largest area in the field regions of the current binary image;

determining whether the region with the largest area is smaller than a first area threshold;

under a condition that the region with the largest area is smaller than the first area threshold, determining that there is no candidate boundary lines in the current frame image, updating a next frame image to be the current frame image, and returning to the step of "inputting the current frame image into the segmentation model of the field regions to output the current binary image";

under a condition that the region with the largest area is greater than or equal to the first area threshold, taking a boundary line with the largest accumulated value along ordinates in the region with the largest area in the current binary image as the candidate boundary line of the current frame image;

determining whether there is a candidate boundary line in a previous frame image of the current frame image;

under a condition that there is no candidate boundary line in the previous frame image of the current frame image, performing the RANSAC line fitting on the candidate boundary line of the current binary image to obtain the field-side boundary line of the current frame image, updating the next frame image to the current frame image, and returning to the step of "inputting the current frame image into the segmentation model of the field regions to output the current binary image";

under a condition that there is the candidate boundary line in the previous frame image of the current frame image, obtaining the field-side boundary line of the current frame image based on the frame association algorithm according to the candidate boundary line of the current frame image and a field-side boundary line of the previous frame image;

determining a region within a setting range of the field-side boundary line of the current frame image as a field-side dynamic interest region of the current frame image;

taking the candidate boundary line outside the coverage of the field-side dynamic interest region of the current frame image as the field-end boundary line;

determining a field end area according to the field-end boundary line;

determining whether the current frame image reaches a field end according to the field end area;

under a condition that the field end is not reached, updating the next frame image to the current frame image, and returning to the step of "inputting the current frame image into the segmentation model of the field regions to output the current binary image;

under a condition that the field end is reached, determining whether there is a field-end boundary line in the previous frame image of the current frame image;

under a condition that there is no field-end boundary line in the previous frame image of the current frame image, performing the RANSAC line fitting on a field end boundary of the current frame image to obtain the field-end boundary line; and under a condition that there is the field-end boundary line in the previous frame image of the current frame image, obtaining the field-end boundary line of the current frame image based on the frame association algorithm according to the candidate boundary line of the current frame image and the field-end boundary line of the previous frame image.

In an embodiment, the inverted residual block includes a first layer, a second layer, a third layer and a fourth layer. The first layer and the third layer are of the same structure and the second layer and the fourth layer are of the same structure.

The first layer includes a 3*3 depthwise convolution layer, a batch normalization layer and a ReLU6 activation function layer, and the second layer includes a 1*1 pointwise convolution layer.

In an embodiment, convolution operations in the improved U-Net network adopt dilated convolution operations.

In an embodiment, the step of pre-processing acquired original images to obtain the image data set specifically includes:

converting the original images into gray images;

flipping the gray images horizontally to obtain flipped images, and rotating the gray images to obtain rotated images with different rotation angles; wherein the rotation angles include +5°, −5°, +15°, −15°, +25° and −25°;

adding the gray images, the flipped images, and the rotated images to the image data set.

In an embodiment, the step of determining the field end area according to the field-end boundary line includes:

accumulating the ordinate values of all the pixel points on the field-end boundary line, wherein the accumulated result is the field end area.

In an embodiment, the step of obtaining the field-side boundary line of the current frame image based on the frame association algorithm according to the candidate boundary line of the current frame image and the field-side boundary line of the previous frame image further includes:

expanding a preset width to both sides of the field-side boundary line of the previous frame image, wherein the expanded range is taken as the field-side dynamic interest region of the current frame image; and performing the RANSAC line fitting on the candidate boundary line in the coverage of the field-side dynamic interest region of the current frame image to obtain the field-side boundary line of the current frame image.

In an embodiment, the step of determining whether the current frame image reaches the field end according to the field end area includes:

determining that the current frame image does not reach the field end, under a condition that the field end area is less than a second area threshold; and determining that the current frame image reaches the field end, under a condition that the field end area is great than or equal to the second area threshold.

A system for identifying a field boundary is also provided in the disclosure.

The system includes an image pre-processing processor configured to pre-process acquired original images to obtain an image data set;

an obtaining processor of a segmentation model of field regions configured to train an improved U-Net network to obtain the segmentation model of the field regions by taking images in the image data set as inputs and marked images corresponding to the input images as outputs; wherein the marked images are binary images for distinguishing the field regions from non-field regions; an inverted residual block is set between maximum pooling layers of an encoder of the improved U-Net network, and the inverted residual block is set between deconvolutional layers of a decoder of the improved U-Net network; and an identification processor of field-side boundary line and field-end boundary line configured to input a current frame image into the segmentation model of the field regions, output a current binary image, and determine the field-side boundary line and the field-end boundary line of the current binary image based on a frame association algorithm and a Random Sample Consensus (RANSAC) line fitting method.

According to the specific embodiments provided by the present disclosure, following technical effects are disclosed:

The improved U-Net network is utilized for performing model training to improve an accuracy of segmentation between the field region and the non-field region. Whether there is a boundary may be determined by utilizing a multi-boundary detection algorithm based on a frame association in combination with an RANSAC line detection algorithm. And the field-side boundary line and the field-end boundary line may be detected in real-time to improve the accuracy of the identification for the boundary, and provide accurate position information for an automatic steering of an agricultural machinery.

BRIEF DESCRIPTION OF THE DRAWINGS

In order to more clearly illustrate the embodiments of the present disclosure or technical solutions in the prior art, the accompanying drawings which need to be used in the embodiments will now be described briefly. Obviously, the drawings in the following description are merely a few embodiments of the disclosure. Those skilled in the art can obtain other drawings according to the accompanying drawings without creative efforts.

DETAILED DESCRIPTION OF THE EMBODIMENTS

In the following, technical solutions in the embodiments of the present disclosure will be clearly and completely described with reference to the accompanying drawings in the embodiment of the present disclosure. Obviously, the described embodiments are only a part of the embodiments of the present disclosure, but not all of the embodiments thereof. Based on the embodiments of the present disclosure, all other embodiments obtained by those skilled in the art without creative efforts shall fall within the scope of the present disclosure.

The present disclosure intends to provide a method and a system for identifying a field boundary, which improves an accuracy of the identification for the boundary.

For a better understanding of above intention, features and advantages of the present disclosure, the present disclosure will be described in further detail with reference to the accompanying drawings and specific embodiments thereof.

Figure 1:
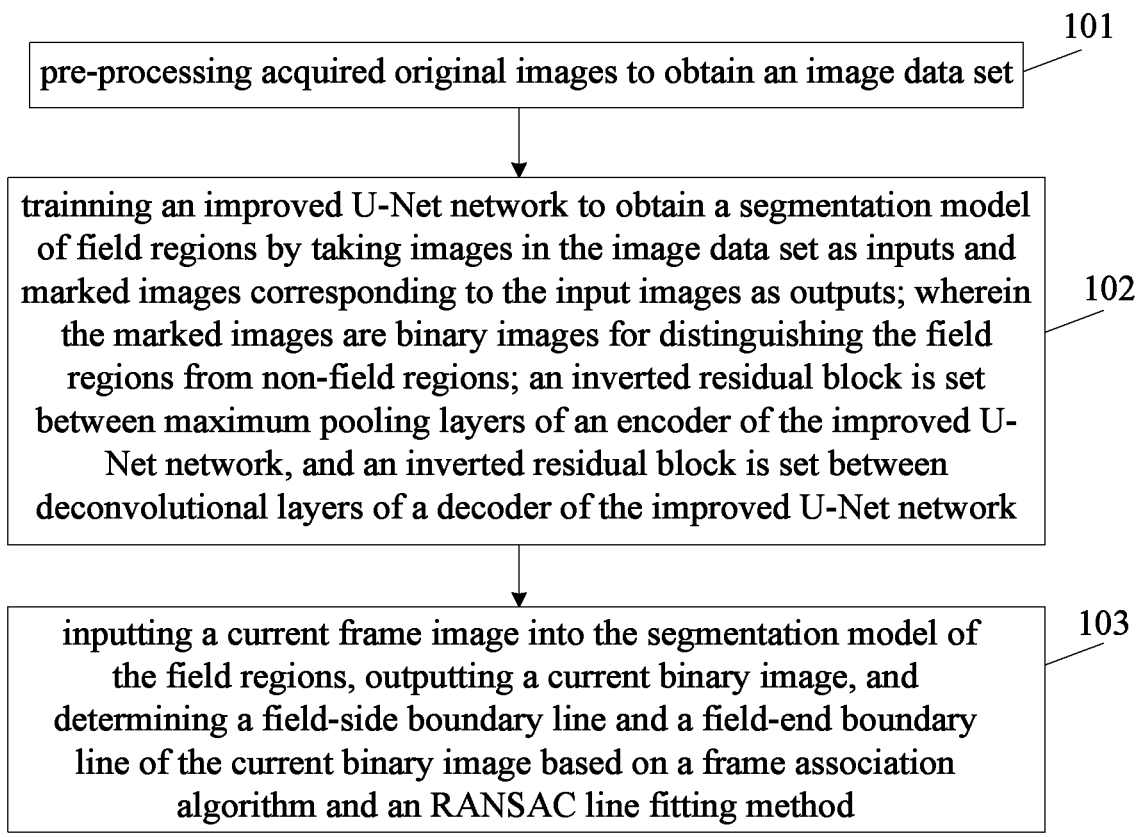
FIG. 1 is a schematic flow chart of a method for identifying a field boundary according to the present disclosure.

FIG. 1 is a schematic flow chart of a method for identifying a field boundary according to the present disclosure. As shown in FIG. 1, the method for identifying the field boundary includes the step 101 to step 103.

Step 101: acquired original images are pre-processed to obtain an image data set.

Wherein, the Step 101 specifically includes:

The original images are converted into gray images. In order to accelerate an operation speed and reduce model parameter, original RGB images are converted into gray images. Taking into account the sensitivity curve of human eyes to different wavelengths, a formula of Gray=0.1140*B+0.5870*G+0.2989*R is used to carry out the gray conversion.

In order to make the model learn more invariant image features and prevent an over-fitting, a data augmentation technology is used. The gray images are horizontally flipped to obtain flipped images. The gray images are rotated to obtain rotated images with different rotation angles. The rotation angles include +5°, −5°, +15°, —15°, +25° and −25°. Seven additional images are thus obtained from one original image.

The gray images, the flipped images, and the rotated images are added to the image data set.

The image data set is divided into three parts: 70% as the training set, 15% as the validation set and 15% as the test set. The training set is configured to train the model and the test set is configured to evaluate a performance of the model.

A training data set at a segmentation stage of field regions and non-field regions includes the original images (input images) and artificially marked pixel-level images (output images).

Step 102: an improved U-Net network is trained to obtain a segmentation model of the field regions by taking images in the image data set as inputs and marked images corresponding to the input images as outputs. The marked images are binary images for distinguishing field regions from non-field regions. An inverted residual block is set between maximum pooling layers of an encoder of the improved U-Net network, an inverted residual block is also set between the deconvolutional layers of a decoder of the improved U-Net network. In the binary images, all the pixel points belonging to the field regions are expressed in white, and the pixel points belonging to the non-field regions are expressed in black.

The inverted residual block includes a first layer, a second layer, a third layer and a fourth layer. The first layer and the third layer are of the same structure, and the second layer and the fourth layer are of the same structure.

The first layer includes a 3*3 depthwise convolution layer, a batch normalization layer and a ReLU6 activation function layer. The second layer includes a 1*1 pointwise convolution layer.

Convolution operations in the improved U-Net network adopt dilated convolution operations.

Figure 2:
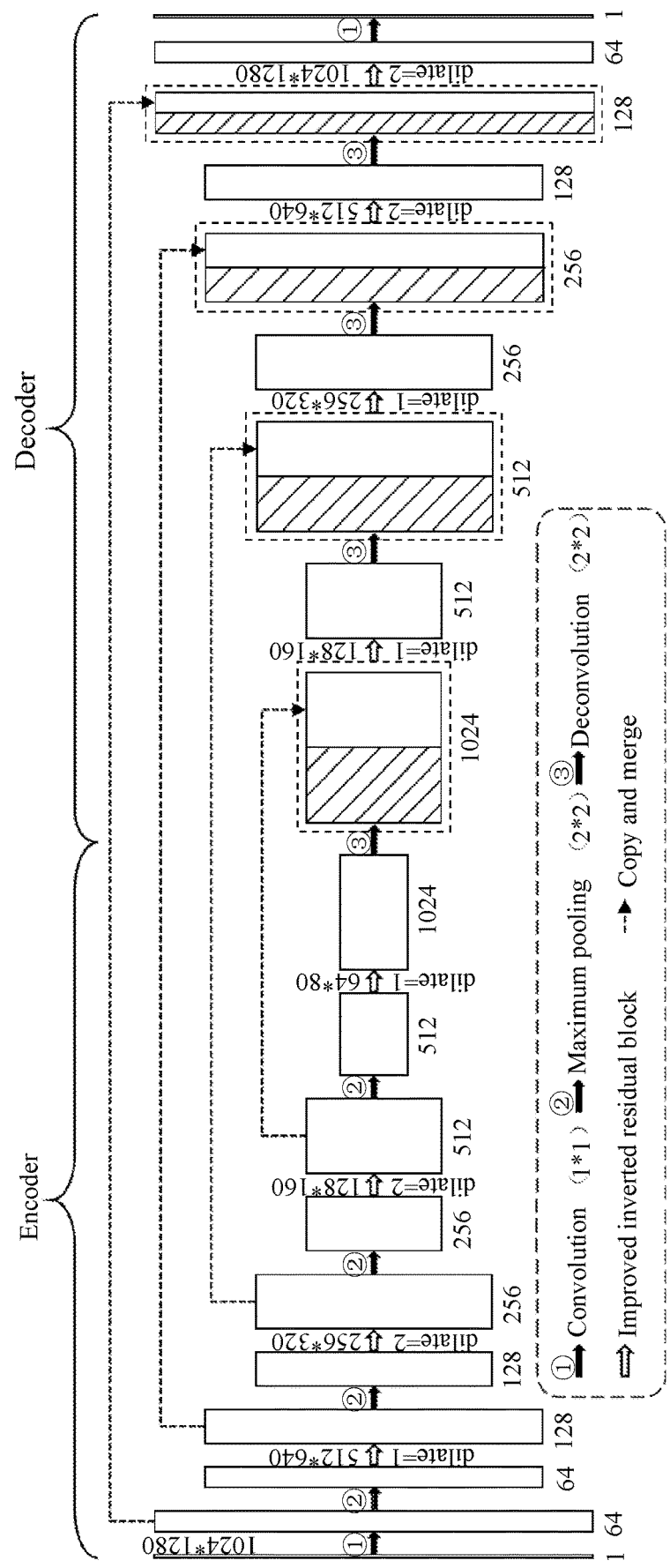
FIG. 2 is a schematic diagram of an improved U-Net network architecture according to the present disclosure.
Figure 3:
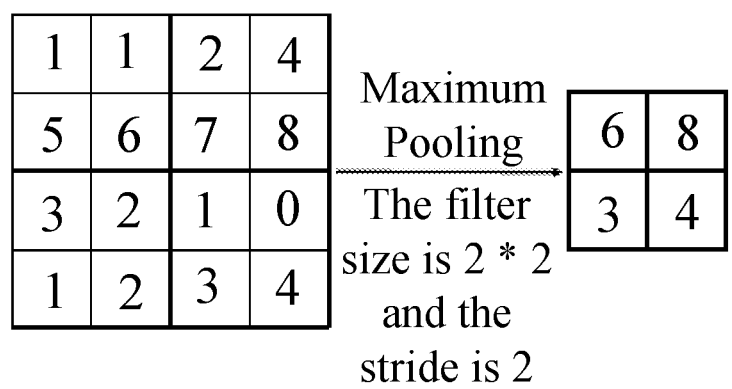
FIG. 3 is a schematic diagram of a maximum pooling.

The improved U-Net network structure is shown in FIG. 2. The improved U-Net network model also adopts a symmetric encoding-decoding structure in a basic U-Net model, which has 4 down-sampling and 4 up-sampling, and the input and output image sizes are the same. As shown in FIG. 2, the encoder (corresponding to the left half of the FIG. 2) applies a maximum pooling (arrow ②) and an improved inverted residual block (white arrow with black edges), which respectively halve the image sizes, and double the number of feature mappings. FIG. 3 is a schematic diagram of a maximum pooling. The encoders are followed by the same number of decoders (corresponding to the right half of the FIG. 2). The decoder includes three parts: a deconvolution operation (arrow ③) that doubles a size of the feature mappings, a connection of resulting feature mappings to the outputs of the previous encoder by a skip connection (as shown with dotted arrows), and the improved inverted residual block (white arrow with black edges). The skip connection enables the model to generate outputs by using multiple input scales. Finally, the last layer of the improved U-Net network model is a 1*1 convolution (arrow ①), which outputs a single feature map representing a prediction value of the network. For the improved U-Net network model, two improvements are made on the basis of the basic U-Net structure, one is to use the improved inverted residual block, the other is to use the dilated convolution, and a dilated rate is set for dilated parameters in FIG. 2.

A general convolution is replaced by a depthwise separable convolution (DWC) to reduce the number of network parameters. The depthwise separable convolution is widely used in real-time tasks for two reasons: fewer parameters need to be adjusted compared to a classical convolution, thus reducing a possible over-fitting; and because of less computation, the computational cost is lower and the depthwise separable convolution is more suitable for real-time vision applications. In a MobileNetV2 network, the DWC constitutes two kinds of convolution blocks, which are called inverted residual blocks.

Figure 4:
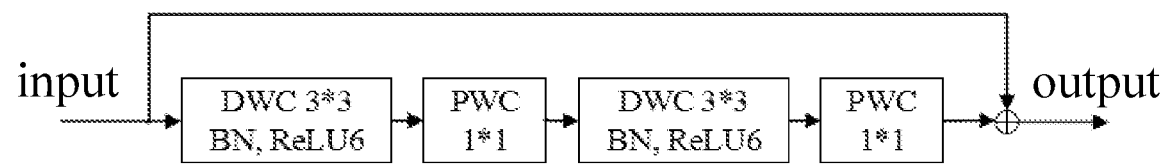
FIG. 4 is a schematic structural diagram of an inverted residual block according to the present disclosure.

A classical convolution operation in the U-Net network is converted into the improved inverted residual block as the inverted residual block of the present disclosure. A connection scheme for each improved inverted residual block is:

y=F(x)+H(x); where y represents an output of the improved inverted residual block and x represents an input of the improved inverted residual block.

Where F(x) is composed of four layers. The first layer includes a 3*3 depthwise convolution (DWC), a batch normalization (BN) and a ReLU6 activation function. The second layer includes a 1*1 pointwise convolution (PWC). The third layer has the same definition as the first layer. The fourth layer has the same definition as the second layer. H(x) is a 1*1 convolution operation whose purpose is to keep characteristic dimensions of input same as that of F(x). The improved inverted residual structure is shown in FIG. 4, which is presented in FIG. 2 as white arrows with black edges.

Figure 5:
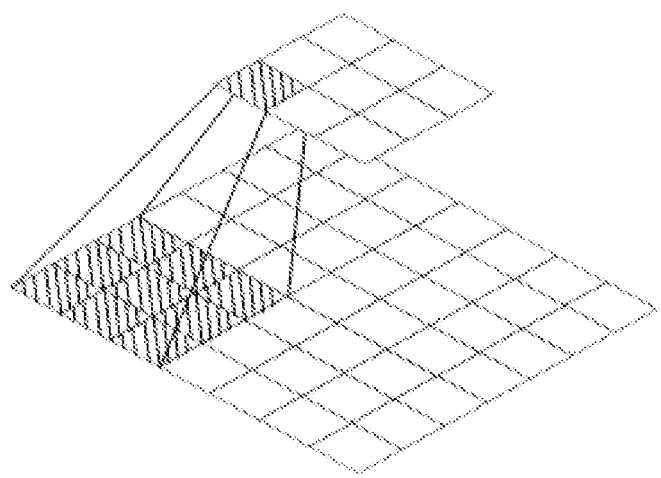
FIG. 5 is a schematic diagram of a standard convolution with a dilation rate of 1 and a convolution kernel size of 3×3 according to the present disclosure.
Figure 6:
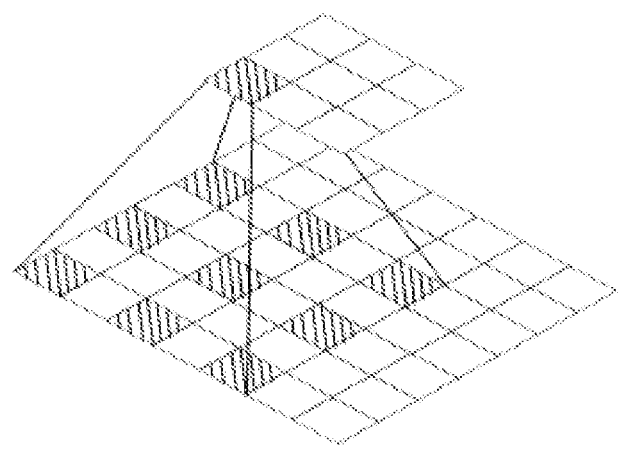
FIG. 6 is a schematic diagram of a dilated convolution with the dilation rate of 2 and the convolution kernel size of 3×3 according to the present disclosure.

The dilated convolution can enlarge a receptive field of the model without losing a size of the feature map, and obtain different information of the receptive field, which is very beneficial to semantic segmentation. FIGS. 5-6 show differences between a standard convolution and an additional dilated convolution. The dilated convolution is added to the improved U-Net network model of the present disclosure. The dilated convolution is used in each of the convolution operations in the improved U-Net architecture. Namely, the value of the dilate is set in each convolution operation of the improved inverted residual block. All settings of the dilate parameters of the improved U-Net network model are shown in FIG. 2.

In order to estimate a difference between the prediction value and the true value of the improved U-Net network model of the present disclosure, the BCEWithLogitsLoss is selected as a segmentation loss function, and the calculation formula of the loss function is as follows:

$$loss(x, y) = 1/N * \sum_{n=1}^{N} l_n$$

$$l_n = -(y_n * \log \sigma(x_n) + (1 - y_n) * \log(1 - \sigma(x_n)))$$

wherein, N is the number of pixels in training samples, $x_n$ is a probability that a prediction sample n is a positive example, and $y_n$ is a label of the sample n, and σ is a sigmoid function. As a specific embodiment, the improved U-Net network uses an RMSprop optimizer with a training period of 100, a batch size of 1, and a learning rate of 0.00001.

Different indicators of performance evaluation, such as accuracy, precision, recall and F1 Score, are calculated. These evaluation indicators are defined as follows:

$$Accuracy = \frac{TP + TN}{TP + TN + FP + FN}$$

$$Precision = \frac{TP}{FP + TP}$$

$$Recall = \frac{TP}{FN + TP}$$

$$F1 - score = \frac{2 * precision * recall}{precision + recall}$$

wherein TP represents that a sample is actually a positive sample and is predicted to be a positive sample; FN represents that a sample is actually a positive sample and is predicted to be a negative sample; FP represents that a sample is actually a negative sample and is predicted to be a positive sample; and TN represents that a sample is actually a negative sample and are predicted to be a negative sample.

It can be seen from Table 1 that the four indicators (Precision, Recall, F1 Score and Accuracy) of the improved U-Net network all have excellent performance.

TABLE 1

Segmentation indicators of the improved U-Net network

| | Precision(%) | Recall(%) | F1 Score(%) | Accuracy(%) |
|---|---|---|---|---|
| Improved U-Net | 97.11 | 99.01 | 97.77 | 97.26 |

In the method for identifying the field boundary, samples containing various environmental noises are trained as a training set, and the obtained training model may effectively identify the field regions and the non-field regions. A multi-boundary detection algorithm based on a frame association is used to detect boundary lines, which can detect field-side boundaries and field-end boundaries simultaneously, and provide accurate position information for automatic steering. Experiments show that the algorithm of the disclosure may realize the automatic steering of the agricultural machinery at the boundary of the field.

Step 103: a current frame image is inputted into the segmentation model of the field regions. A current binary image is inputted, and a field-side boundary line and a field-end boundary line of the current binary image are determined based on a frame association algorithm and a Random Sample Consensus (RANSAC) line fitting method.

The steering of the agricultural machinery is controlled according to the field-side boundary line and the field-end boundary line of the current frame image.

Wherein, the step 103 is specifically implemented as follows:

The current frame image is input into the segmentation model of the field regions to output the current binary image.

A region with the largest area in the field regions of the current binary image is obtained.

It is determined whether the region with the largest area is smaller than a first area threshold.

Under a condition that the region with the largest area is smaller than the first area threshold, it is determined that there is no candidate boundary lines in the current frame image, a next frame image is updated to the current frame image, and the process returns to the step that the current frame image is input into the segmentation model of the field regions to output the current binary image.

Figure 8:
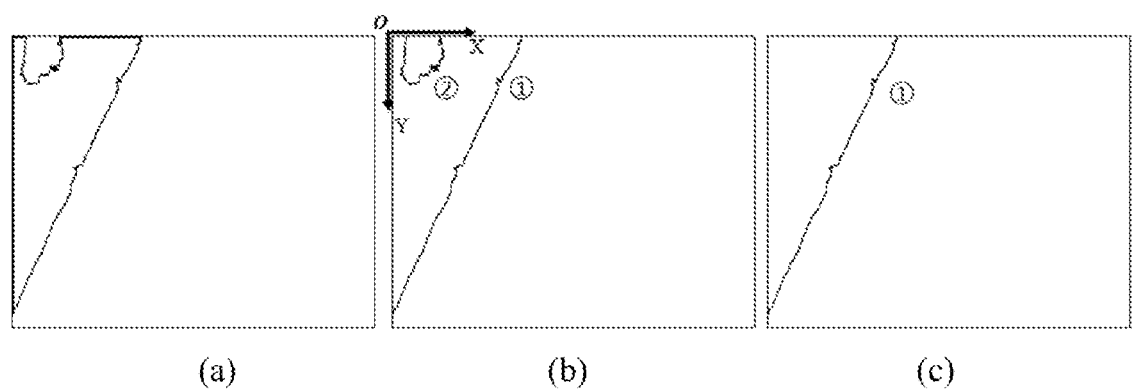
FIG. 8 is a flow chart of an extraction of a candidate boundary according to the present disclosure.

Under a condition that the region with the largest area is greater than or equal to the first area threshold, a boundary line with the largest accumulated value along ordinates in the current binary image is taken as the candidate boundary line of the current frame image. Wherein, an extraction process of the candidate boundary line is as shown in FIG. 8. Firstly, a classified binary image (current binary image) is obtained through the segmentation model of the field regions. Secondly, an open morphological operation (an erosion operation followed by a dilation operation) is performed for removing tiny isolated noise points in the binary images. Thirdly, an outer contour of the non-field regions obtained by classification is returned using a findContours function, which is shown by the black curve in (a) of FIG.

8. Fourth, the lines attached to four edges of the image are deleted to obtain a number of separated curves, which is shown by the curve ① and the curve ② in (b) of FIG. 8. Fifth, an upper left corner of the image is taken as an origin, the horizontal axis is taken as X axis and the vertical axis is taken as Y axis, the y values of each pixel of each curves are accumulated, and the curve with the largest accumulated value is selected as the candidate boundary. As a result the curve ① in (c) of FIG. 8 is selected, so the curve ① is the candidate boundary of the frame image.

It is determined whether there is a candidate boundary line in a previous frame image of the current frame image.

Under a condition that there is no candidate boundary line in the previous frame image of the current frame image, the RANSAC line fitting is performed on the candidate boundary line of the current binary image to obtain the field-side boundary line of the current frame image. The next frame image is updated to the current frame image, and the process returns to the step that the current frame image is input into the segmentation model of the field regions to output the current binary image.

Under a condition that there is the candidate boundary line in the previous frame image of the current frame image, the field-side boundary line of the current frame image is obtained based on the frame association algorithm according to the candidate boundary line of the current frame image and a field-side boundary line of the previous frame image.

A region within a setting range of the field-side boundary line of the current frame image is determined as a field-side dynamic interest region of the current frame image.

The candidate boundary line outside the coverage of the field-side dynamic interest region of the current frame image is taken as the field-end boundary line.

A field end area is determined according to the field-end boundary line.

It is determined whether the current frame image reaches a field end according to the field end area.

Under a condition that the field end is not reached, the next frame image is updated to the current frame image, and the process returns to the step that the current frame image is input into the segmentation model of the field regions to output the current binary image.

Under a condition that the field end is reached, it is determined whether there is a field-end boundary line in the previous frame image of the current frame image.

Under a condition that there is no field-end boundary line in the previous frame image of the current frame image, the RANSAC line fitting is performed on a field end boundary of the current frame image to obtain the field-end boundary line.

And under a condition that there is the field-end boundary line in the previous frame image of the current frame image, the field-end boundary line of the current frame image is obtained based on the frame association algorithm according to the candidate boundary line of the current frame image and the field-end boundary line of the previous frame image.

The step of determining the field-end area according to the field-end boundary line specifically includes:

accumulating the ordinate values of all pixel points on the field-end boundary line; wherein the accumulated result is the field end area.

The step of obtaining the field-side boundary line of the current frame image based on the frame association algorithm according to the candidate boundary line of the current frame image and the field-side boundary line of the previous frame image includes:

expanding a preset width to both sides of the field-side boundary line of the previous frame image; wherein the expanded range is taken as the field-side dynamic interest region of the current frame image; and performing the RANSAC line fitting on the candidate boundary line in the coverage of the field-side dynamic interest region of the current frame image to obtain the field-side boundary line of the current frame image.

The step of determining whether the current frame image reaches the field end according to the field end area includes:

determining that the current frame image does not reach the field end, under a condition that the field end area is less than a second area threshold; and determining that the current frame image reaches the field end, under a condition that the field end area is great than or equal to the second area threshold.

Figure 7:
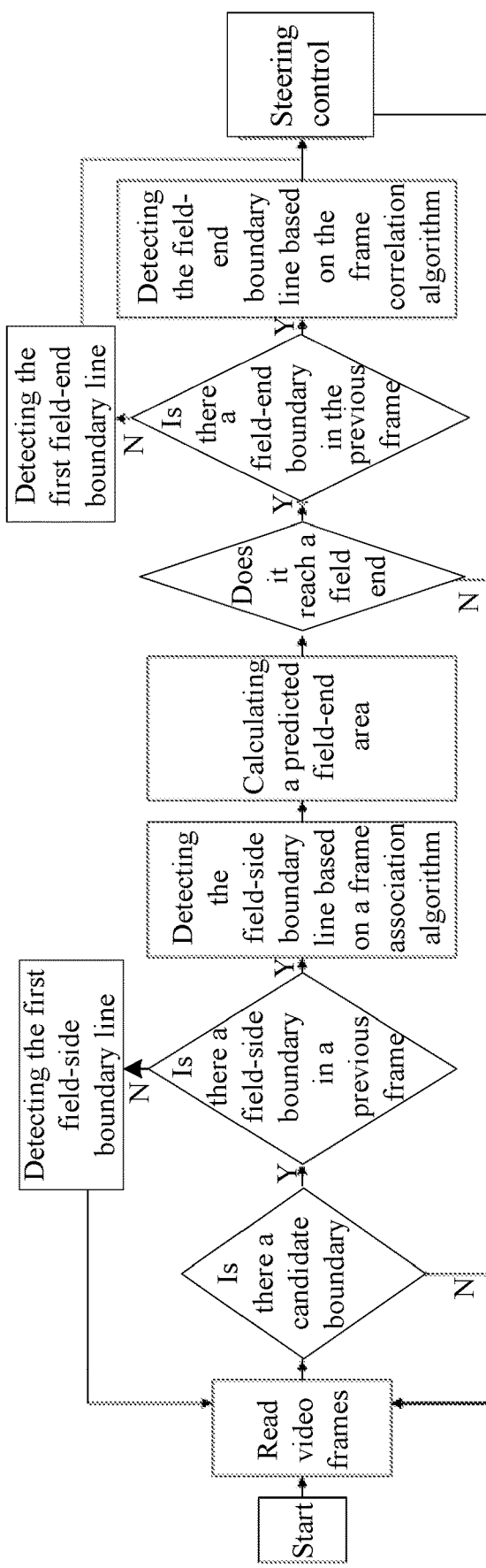
FIG. 7 is a flow chart of a steering control of an agricultural machine based on the method for identifying the field boundary according to the present disclosure.

As a specific embodiment, a flow of a steering control of the agricultural machinery by the method of identifying the field boundary according to the present disclosure is shown in FIG. 7.

The field-side boundary line is a navigation target line when the agricultural machinery enters the field for a first time. One side of the field-side boundary line is an intra-field region and the other side is an extra-field region. A boundary line of the extra-field region is taken as a detection target. The position of the extra-field region on the image varies with the direction of the agricultural machinery entering the field for a first time. In this embodiment, the detection algorithm is discussed by taking the extra-field region at a left side of the image as an example. When the agricultural machinery steers, the steering of the agricultural machinery is assisted by the field-side boundary line and the field-end boundary line in a safe range. Therefore, in the process of agricultural machinery operation, it is also necessary to determine whether the agricultural machinery reaches the field end in real time. The specific detection algorithm is as follows:

(1) a video frame is read.

(2) it is determined whether there is the candidate boundary: the classified binary image is obtained through a deep learning training. The field region is set as a background and the non-field region is set as a foreground. A region with the maximum area in the foreground is found. Under a condition that the maximum area is small than the first area threshold, the frame (current frame image) is determined to have no candidate boundary, the next frame image is read, and the process returns to the step (1). Otherwise, there is a candidate boundary in the frame, and the candidate boundary is obtained by a candidate boundary extraction algorithm described above. Step (3) is then carried out.

(3) it is determined whether there is the candidate boundary in the previous frame. Step (4) is performed under a condition that there is no candidate boundary in the previous frame, and step (5) is performed under a condition that there is a candidate boundary in the previous frame.

(4) the first field-side boundary line is detected. The RANSAC line fitting is performed on the candidate boundary obtained in step (2). The number of iterations is set to 50, and the probability P of calculating a correct model is set to 0.99, and the first field-side boundary line (field-side boundary line) is obtained. Then the process returns to the step (1).

Figure 9:
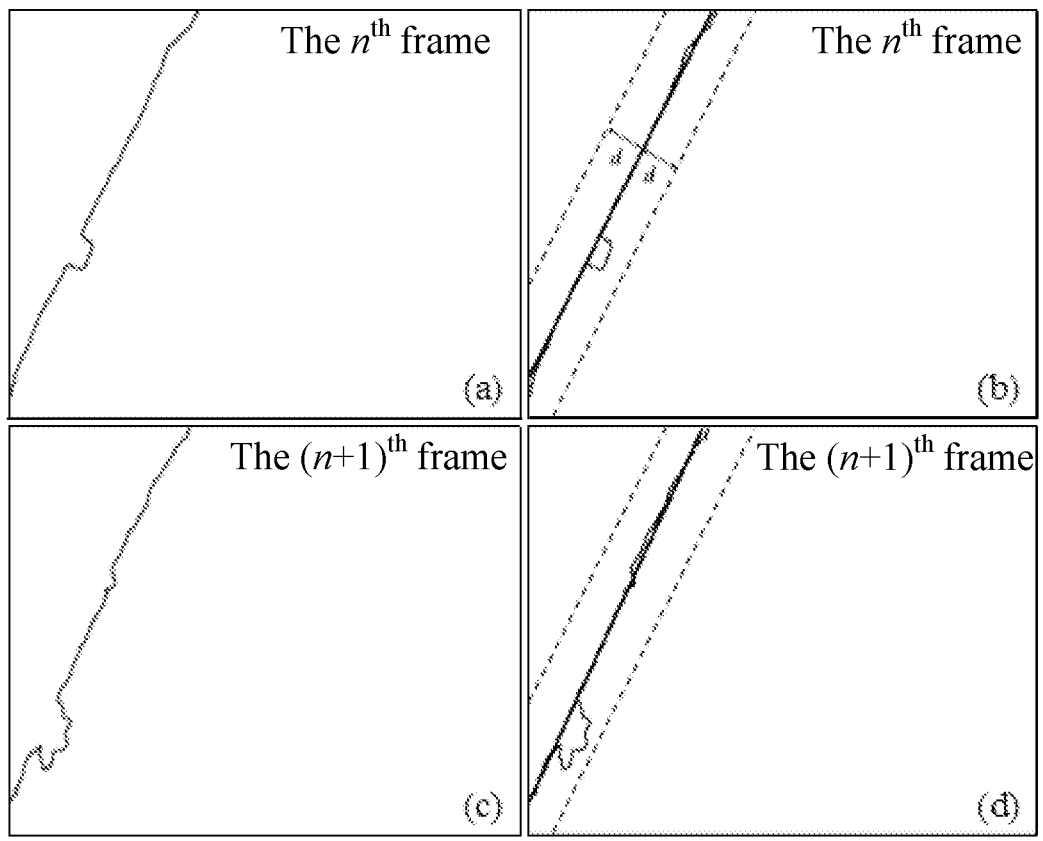
FIG. 9 is a flow chart of a detection of a field-side boundary according to the present disclosure.

(5) the field-side boundary line is detected based on the frame association algorithm. The candidate boundary of the current frame image (marked as the $(n+1)^{th}$ frame) is shown as a black curve in (c) of FIG. 9. The candidate boundary of the previous frame image (marked as the $n^{th}$ frame) is shown as a black curve in (a) of FIG. 9. The field-side dynamic interest region of the current frame is determined by the field-side boundary line detected in the previous frame. The field-side boundary line detected in the previous frame is extended parallel to both sides by a certain width d, which is shown by two dotted lines in (b) of FIG. 9. The region between the two parallel dotted lines is the field-side dynamic interest region of the current frame, and the field-side boundary line of the frame image is obtained by performing the RANSAC line fitting on the candidate boundary line in the region, which is shown by the black straight line in (d) of FIG. 9.

Figure 10:
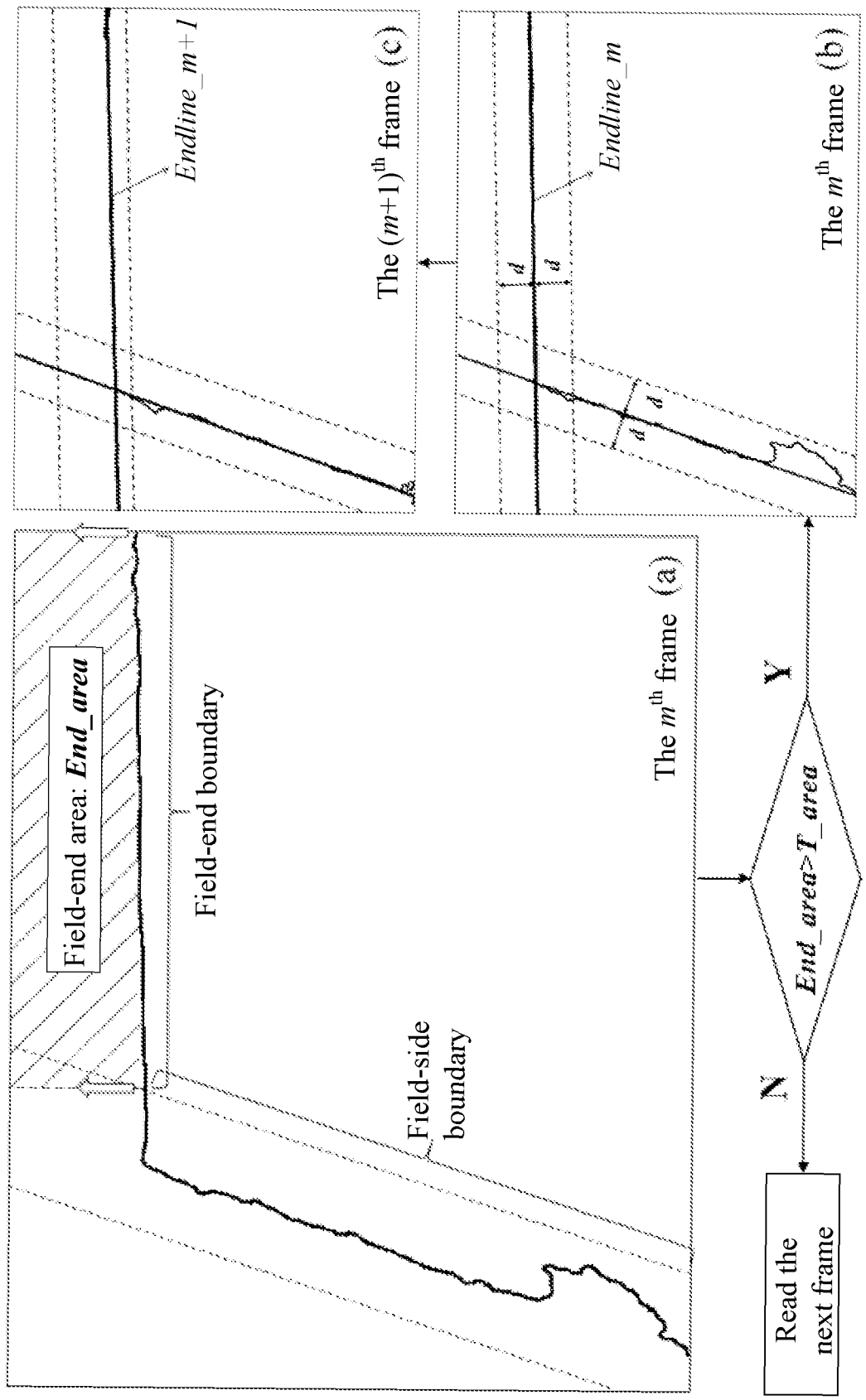
FIG. 10 is a flow chart of a detection of a field-end boundary according to the present disclosure.

(6) predicted field-end area is calculated. As shown in (a) of FIG. 10, the candidate boundary of the frame image is obtained in the step (2), that is, the black curve in (a) of FIG. 10. A boundary in the field-side dynamic interest region (namely the region between the two right-tilted long dotted lines) is the field-side boundary. A boundary outside the field-side dynamic interest region is the field-end boundary. The y values of all the pixel points at the field-end boundary are accumulated to obtain the predicted field-end area, which is recorded as End_area, which is shown as right-tilted short-hatched area in (a) of FIG. 10.

(7) it is determined whether the field end is reached. Under a condition that the End_area is less than a second area threshold T_area, it is determined that the current frame does not reach the field end, and then the next frame image is read, and the process returns to the step (1); otherwise, it is determined that the current frame reaches the field end, and the step (8) is performed.

(8) it is determined whether there is a field-end boundary in the previous frame. Under a condition that there is no field-end boundary in the previous frame, step (9) is performed; and under a condition that there is a field-end boundary, step (10) is performed.

(9) the first field-end boundary line is detected. The RANSAC line fitting is performed on the obtained field-end boundary line to obtain the first field-end boundary line, which is shown as the black straight line of EndLine_m in (b) of FIG. 10. Then the detection algorithm turns to step (11).

(10) the field-end boundary line is detected based on the frame association algorithm. Similar to step (5), the field-end boundary line detected in the previous frame is extended to both sides in parallel by a certain width, and the width is set as an empirical value d. The two parallel lines are shown as approximately horizontal dotted lines in (b) of FIG. 10. The region between the two dotted lines is the field-end dynamic interest region of the current frame. The field-end boundary line of the frame image is obtained by performing RANSAC line fitting on the candidate boundary lines of the region, which is shown by the black straight line EndLine_m+1 in (c) of FIG. 10.

(11) steering control: the steering control may be carried out on the agricultural machinery with the boundary information of the field side and the field end.

The accuracy of the algorithm is tested in four different scenes of the fields to obtain four sets of videos. An error is defined as an angle between a detected line of the field boundary and a line marked manually. As shown in Table 2, the obtained results show that the final average error is 0.773°. And it can be seen that the algorithm of the disclosure has advantages of smaller boundary identification error and more accurate detection of straight line, which satisfies the requirements of actual operations.

TABLE 2-1

Error results of boundary line detection

| Error (°) | Video 1 | Video 2 | Video 3 | Video 4 | Average Error |
|---|---|---|---|---|---|
| The algorithm of the present disclosure | 0.161 | 0.927 | 0.742 | 1.262 | 0.773 |
| Directly based on RANSAC algorithm | 0.486 | 3.993 | 3.858 | 1.760 | 2.524 |

Figure 11:
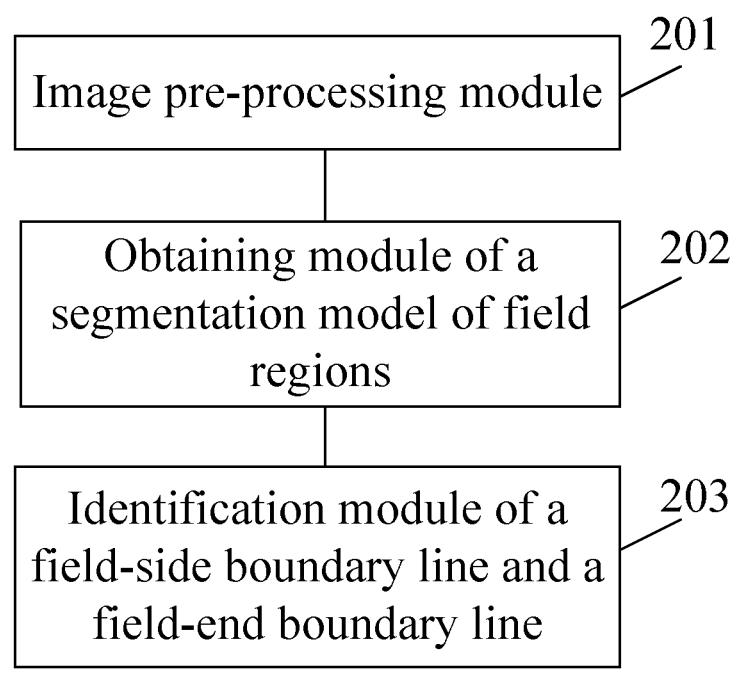
FIG. 11 is a schematic structural diagram of a system for identifying a field boundary according to the present disclosure.

FIG. 11 is a schematic structural diagram of a system for identifying a field boundary according to the present disclosure. As shown in FIG. 11, the system for identifying the field boundary is disclosed. The system includes:

an image pre-processing processor 201, configured to pre-process acquired original images to obtain an image data set;

an obtaining processor of a segmentation model of field regions 202, configured to train an improved U-Net network to obtain the segmentation model of the field regions by taking images in the image data set as inputs and marked images corresponding to the input images as outputs; wherein the marked images are binary images for distinguishing the field regions from non-field regions; an inverted residual block is set between maximum pooling layers of an encoder of the improved U-Net network, and an inverted residual block is set between deconvolutional layers of a decoder of the improved U-Net network; and an identification processor of a field-side boundary line and a field-end boundary line 203, configured to input a current frame image into the segmentation model of the field regions, output a current binary image, and determine the field-side boundary line and the field-end boundary line of the current binary image based on a frame association algorithm and a Random Sample Consensus (RANSAC) line fitting method.

Various embodiments in the description have been described in a progressive manner, each of which emphasizes the differences from others, and among which the same and similar parts may be referred to each other. As for the system disclosed in the embodiment, since it corresponds to the method disclosed in the embodiment, the description is relatively simple. The relevant parts can be referred to the description of the method parts.

The principles and implementation of the present disclosure have been described herein with specific examples, and the above embodiments are described for a better understanding of the methods and the core concepts of the present disclosure. Meanwhile, the detailed implementation and the application scope could be amended by those of ordinary skill in the art according to the teachings of the present disclosure. In conclusion, the contents of this specification should not be constructed as limiting the present disclosure.

What is claimed is:
1. A method for identifying a field boundary, comprising:
pre-processing acquired original images to obtain an image data set;
training an improved U-Net network to obtain a segmentation model of field regions by taking images in the image data set as inputs and marked images corresponding to the input images as outputs; wherein the marked images are binary images for distinguishing the field regions from non-field regions; an inverted residual block is set between maximum pooling layers of an encoder of the improved U-Net network, and an inverted residual block is set between deconvolutional layers of a decoder of the improved U-Net network; and inputting a current frame image into the segmentation model of the field regions, outputting a current binary image, and determining a field-side boundary line and a field-end boundary line of the current binary image based on a frame association algorithm and a Random Sample Consensus (RANSAC) line fitting method.

2. The method for identifying the field boundary according to claim 1, wherein inputting the current frame image into the segmentation model of the field regions, outputting the current binary image, and determining the field-side boundary line and the field-end boundary line of the current binary image based on the frame association algorithm and the RANSAC line fitting method comprises:

inputting the current frame image into the segmentation model of the field regions to output the current binary image;

obtaining a region with a largest area in the field regions of the current binary image;

determining whether the region with the largest area is smaller than a first area threshold;

under a condition that the region with the largest area is smaller than the first area threshold, determining that there is no candidate boundary lines in the current frame image, updating a next frame image to the current frame image, and returning to the step of inputting the current frame image into the segmentation model of the field regions to output the current binary image;

under a condition that the region with the largest area is greater than or equal to the first area threshold, taking a dividing line with a largest accumulated value along an ordinate in the current binary image as a candidate boundary line of the current frame image;

determining whether there is a candidate boundary line in a previous frame image of the current frame image;

under a condition that there is no candidate boundary line in the previous frame image of the current frame image, performing the RANSAC line fitting on the candidate boundary line of the current binary image to obtain the field-side boundary line of the current frame image, updating the next frame image to the current frame image, and returning to the step of inputting the current frame image into the segmentation model of the field regions to output the current binary image;

under a condition that there is the candidate boundary line in the previous frame image of the current frame image, obtaining the field-side boundary line of the current frame image based on the frame association algorithm according to the candidate boundary line of the current frame image and a field-side boundary line of the previous frame image;

determining a region within a setting range of the field-side boundary line of the current frame image as a field-side dynamic interest region of the current frame image;

taking the candidate boundary line outside the coverage of the field-side dynamic interest region of the current frame image as the field-end boundary line;

determining a field end area according to the field-end boundary line;

determining whether the current frame image reaches a field end according to the field end area;

under a condition that the field end is not reached, updating the next frame image to the current frame image, and returning to the step of inputting the current frame image into the segmentation model of the field regions to output the current binary image;

under a condition that the field end is reached, determining whether there is a field-end boundary line in the previous frame image of the current frame image;

under a condition that there is no field-end boundary line in the previous frame image of the current frame image, performing the RANSAC line fitting on a field end boundary of the current frame image to obtain the field-end boundary line; and under a condition that there is the field-end boundary line in the previous frame image of the current frame image, obtaining the field-end boundary line of the current frame image based on the frame association algorithm according to the candidate boundary line of the current frame image and the field-end boundary line of the previous frame image.

3. The method for identifying the field boundary according to claim 2, wherein determining the field end area according to the field-end boundary line comprises:

accumulating ordinate values of all pixel points on the field-end boundary line; wherein the accumulated result is the field end area.

4. The method for identifying the field boundary according to claim 2, wherein obtaining the field-side boundary line of the current frame image based on the frame association algorithm according to the candidate boundary line of the current frame image and the field-side boundary line of the previous frame image comprises:

expanding a preset width to both sides of the field-side boundary line of the previous frame image; wherein the expanded range is taken as the field-side dynamic interest region of the current frame image; and performing the RANSAC line fitting on the candidate boundary line in the coverage of the field-side dynamic interest region of the current frame image to obtain the field-side boundary line of the current frame image.

5. The method for identifying the field boundary according to claim 2, wherein determining whether the current frame image reaches the field end according to the field end area comprises:

determining that the current frame image does not reach the field end, under a condition that the field end area is less than a second area threshold; and determining that the current frame image reaches the field end, under a condition that the field end area is great than or equal to the second area threshold.

6. The method for identifying the field boundary according to claim 1, wherein the inverted residual block comprises a first layer, a second layer, a third layer and a fourth layer; the first layer and the third layer are of the same structure; and the second layer and the fourth layer are of the same structure;

the first layer comprises a 3*3 depthwise convolution layer, a batch normalization layer and a ReLU6 activation function layer, and the second layer comprises a 1*1 pointwise convolution layer.

7. The method for identifying the field boundary according to claim 1, wherein convolution operations in the improved U-Net network are dilated convolution operations.

8. The method for identifying the field boundary according to claim 1, wherein the step of pre-processing acquired original images to obtain the image data set comprises:

converting the original images into gray images;

flipping the gray images horizontally to obtain flipped images, and rotating the gray images to obtain rotated images with different rotation angles; wherein the rotation angles comprise +5°, −5°, +15°, −15°, +25° and −25°; and adding the gray images, the flipped images, and the rotated images to the image data set.

9. A system for identifying a field boundary, comprising:

an image pre-processing processor, configured to pre-process acquired original images to obtain an image data set;

an obtaining processor of a segmentation model of field regions, configured to train an improved U-Net network to obtain the segmentation model of the field regions by taking images in the image data set as inputs and marked images corresponding to the input images as outputs; wherein the marked images are binary images for distinguishing the field regions from non-field regions; an inverted residual block is set between maximum pooling layers of an encoder of the improved U-Net network, and an inverted residual block is set between deconvolutional layers of a decoder of the improved U-Net network; and an identification processor of a field-side boundary line and a field-end boundary line, configured to input a current frame image into the segmentation model of the field regions, output a current binary image, and determine the field-side boundary line and the field-end boundary line of the current binary image based on a frame association algorithm and a Random Sample Consensus (RANSAC) line fitting method.

\* \* \* \* \*